Sept. 13, 1949.　　　　E. E. GREGORY　　　　2,481,587
FISHING LEADER MAKING DEVICE
Filed July 3, 1948
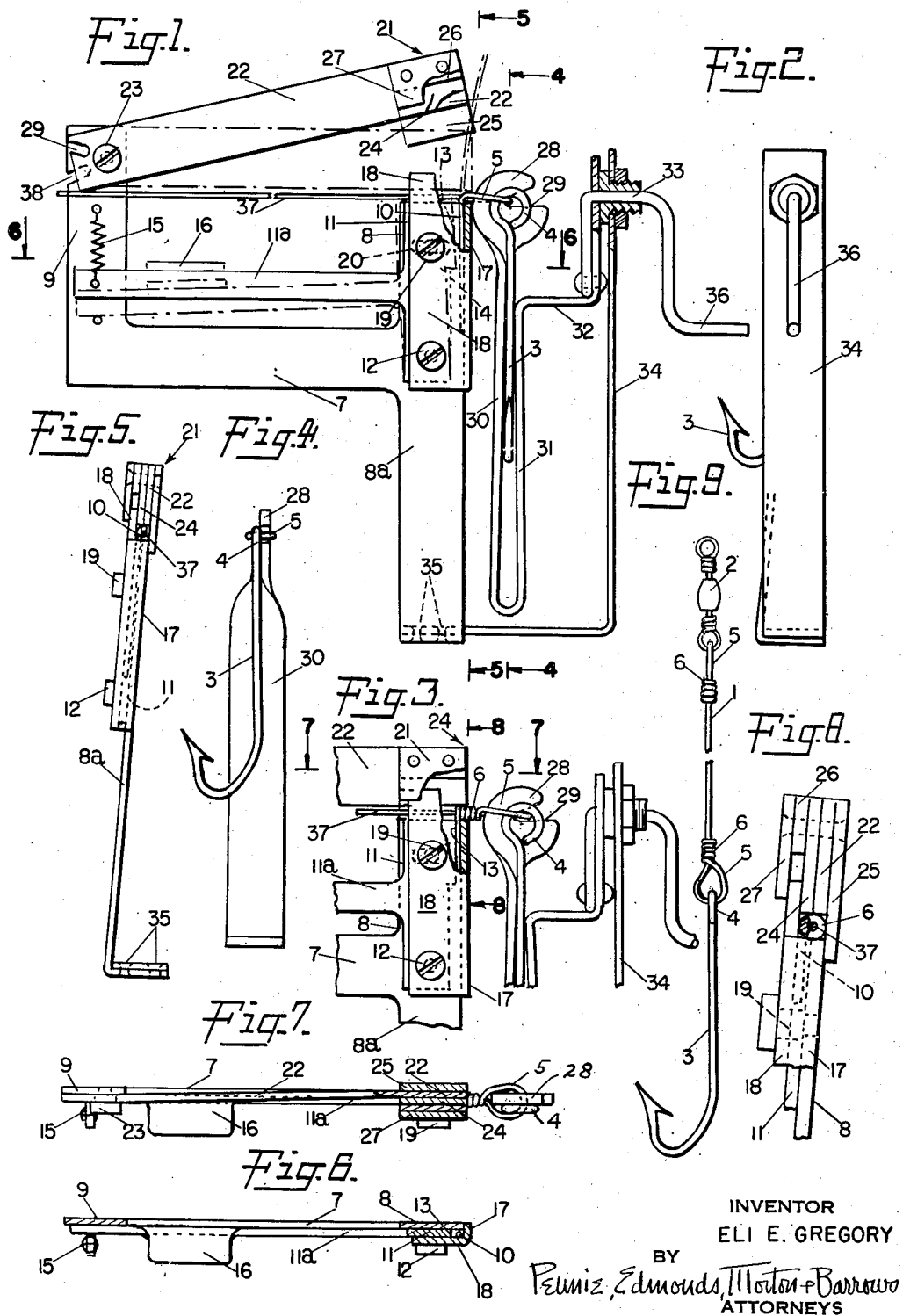
INVENTOR
ELI E. GREGORY
BY
Pennie, Edmonds, Morton & Barrows
ATTORNEYS Patented Sept. 13, 1949

2,481,587

UNITED STATES PATENT OFFICE 2,481,587

FISHING LEADER MAKING DEVICE

Eli E. Gregory, Lewisport, Ky.

Application July 3, 1948, Serial No. 36,853

5 Claims. (Cl. 140—124)

This invention relates to devices for making fishing leaders, and, more particularly, to devices for facilitating the applying of a fish lure, hook, swivel, connector, or the like, to the ends of a length of wire to form the leader, the purpose of the invention being to provide an improved device of this sort.

One form of leader which is used extensively in both salt and fresh water fishing consists of a piece of wire of suitable gauge and length, usually from one to three feet, having a swivel secured to one end, and a hook attached to the opposite end. In some cases, instead of attaching the hook directly to the leader, the leader is provided with a connector to make it easier to change to a different size or style of hook or lure. Whatever device is to be attached to the leader, whether hook, swivel, connector, or the like, such device is often provided with a closed eye and is attached to the leader by forming a loop adjacent the end of the leader wire and then tightly coiling the wire upon itself to close this loop and fix the hook, or the like, permanently to the end of the leader.

The formation of this loop with the usual hand tools, particularly the coiling of the end of the leader wire upon itself, is a laborious operation, especially when a stiff leader wire is used. Also, it may be desired to change quickly from one length of leader to another, or to replace a broken or damaged leader. It is sometimes inconvenient to carry a supply of leaders of various lengths and desirable to make up on the spot the particular type of leader required.

Accordingly, the primary object of the present invention is to provide a device which will facilitate the formation of the loop in the leader wire and the coiling of the wire upon itself to close the loop, and which will produce a smooth coil.

Another object of the invention is to provide a device which will facilitate the assembly of the leader wire and the hook, or the like, and which also will assist in forming the loop prior to the coiling of the end of the wire on itself beyond the loop.

Another object of the invention is to provide such a device which is extremely simple in construction and light in weight so that it may be carried with other fishing equipment, thereby enabling a leader of any length to be made at any time merely from a supply of leader wire and the requisite swivels, hooks, and the like.

When it is attempted to make up leaders on the spot by the use of a pair of pliers and wire cutters, the coiling of the wire on itself to close the leader loop may be accomplished with apparent satisfaction, but there is danger of damaging the wire through the use of these tools. The damage may be unnoticed, or undiscoverable, but may cause the leader to break at just the wrong time. Another important object of the invention, therefore, is the provision of a device which will form the coil about the body of the leader wire without damaging or weakening the wire in any way.

The invention will be understood from a consideration of the accompanying drawings in which a single embodiment of the invention has been illustrated by way of example.

In these drawings:

Fig. 1 is a view of the leader making device in side elevation with parts broken away and shown in section;

Fig. 2 is a view of the device in partial and elevation looking from the right of Fig. 1;

Fig. 3 is a fragmentary view similar to Fig. 1 with certain parts shown in different positions;

Fig. 4 is a detail section taken on line 4—4 of Fig. 1;

Fig. 5 is a vertical transverse section taken on line 5—5 of Fig. 1;

Fig. 6 is a horizontal section taken on line 6—6 of Fig. 1;

Fig. 7 is a similar section taken higher up and with the law closed. (See line 7—7 of Fig. 3.);

Fig. 8 is a vertical transverse section taken on line 8—8 of Fig. 3; and

Fig. 9 is a view of one form of leader made by means of the device of the invention.

Referring now to the accompanying drawings, and first to Fig. 9, this figure illustrates one form of leader which may be made on the apparatus or device of the present invention. It consists of a wire 1 of the proper length for the particular kind of fishing at hand. This wire will also be of suitable gauge to provide the strength desired, and, accordingly, the wire may vary in size considerably, but will usually be comparatively stiff and difficult to bend or coil.

At its upper end, the leader wire 1 may have a swivel, such as that indicated at 2, attached to it or it may be attached directly to the fishing line. At its lower end, a hook 3 is attached. Hook 3 is provided with a closed eye 4 through which a loop 5, formed toward the lower end of the leader wire 1, passes. Loop 5 is closed by winding the end portion of the leader wire about its body portion to form a coil 6. Swivel 2 is attached in a similar way.

The leader making device has a frame (Fig. 1)

consisting of a horizontal member 7 having upright members 8 and 9 secured, respectively, at its right and left ends, upright member 8 having a lower extension 8a for a purpose which will presently appear. These frame members 7, 8, 8a and 9 are shown as being made in one piece for simplicity of illustration, and they, accordingly, lie in the same plane which is tilted somewhat from the vertical as indicated in Fig. 5. It will be understood, however, that if desired these frame members can be made of separate parts riveted or otherwise permanently secured together.

On the front surface of frame member 8 are mounted parts which constitute a guiding and friction-applying means for the end portion 10 of a piece of leader wire stock which is inserted from above as indicated in Fig. 1. This guiding and friction-applying means comprises a clamping member 11 which is pivoted near its lower end on a screw 12, and which has an upper wire engaging portion 13, the lower portion of member 11 being relieved by means of a shoulder 14. Clamping member 11 has an actuating lever 11a extending to the left to upright frame member 9 where it is connected to a tension spring 15 which biases the wire engaging portion 13 against the surface of wire 10. A thumb pad 16 is provided to depress lever 11 and retract portion 13 to permit the insertion of wire end portion 10. In Fig. 1, the dot and dash lines indicate the released position of member 11.

The wire engaging portion 13 of clamping member 11 forces wire end portion 10 against the inner surface of a lip or flange 17 which extends vertically in contact with the right edge of frame member 8 (Figs. 1, 3 and 6). Lip or flange 17 is formed on a cover member 18 mounted in front of pivoted clamping member 11 and fixed to frame member 8 by means of pivot screw 12 and a second screw 19. Screw 19 is shown in side view in dotted lines in Fig. 8 from which it will be understood that it has a reduced end portion which is tapped into frame member 8 and provided with a shoulder which spaces the head of the screw from the surface of frame member 8 a distance corresponding to the combined thicknesses of clamping member 11 and cover member 18. Screw 12 is similar. A slot 20 indicated in dotted lines in Fig. 1 is provided in clamping member 11 to permit its pivotal movement about screw 12.

Fig. 6 shows that wire end portion 10 is confined at the sides by the surfaces of members 18 and 8. It will be understood that when the lever 11a is depressed the wire engaging surface 13 is withdrawn from the inner surface of lip 17 so as to leave an aperture in which the wire end portion 10 can be inserted.

The upper end of frame member 8 and the upper surface of clamping member 11, also the upper surface of lip 17, together constitute a coil-forming anvil (Figs. 8 and 5) which will be referred to hereafter. Cooperating with this anvil is a jaw member, indicated generally by numeral 21, which is mounted at the right-hand of a bar 22 pivoted to the upper end of frame member 9 at 23. Jaw member 21 is comprised of the lower surface of bar 22, which is vertically above the end of frame member 8, and a block 24 which is mounted on the front surface of the right-hand end portion of bar 22 and cooperates with the upper end of member 11 when jaw 21 is moved to closed position (Figs. 8, 5 and 3).

In addition to members 22 and 24, jaw 21 also has a rear positioning guide 25, a filler block 26 and a front positioning guide 27. Rear positioning guide 25 cooperates with the rear surface of frame member 8, and front positioning guide 27 with the front surface of the projecting upper end of member 18 when jaw 21 is closed.

Mounted at the right for rotation about an axis which is parallel to and substantially in line with the surfaces of the anvil members mentioned, there is a loop-forming and supporting head 28. Head 28 is provided with an open slot 29 on the opposite side thereof from the anvil and jaw 21. Head 28 is flattened on its sides and is formed at the end of one leg 30 of a closed U-shaped member, the other leg 31 of which is offset at 32 and fixed to a rotatable shaft 33 in any suitable manner. Shaft 33 is mounted for rotation at the upper end of an L-shaped frame member 34 which is permanently secured, as by means of rivets 35, to the lower end of frame member 8a which is bent rearwardly as shown in Fig. 5 for this purpose. Member 8a and the other parts supported thereon are tilted as shown in this figure in order to align shaft 33 with the coil-forming anvil and cooperating jaw 21, that is to say, with the center of the coil-shaping mechanism of the device.

The purpose of the closed U-shaped device 30, 31 is to form a clamp by which the hook 3 may be releasably supported for rotation with the loop-forming head 28 with the eye 4 of the hook alongside of the slot 29. For this reason, members 30 and 31 are made of resilient metal so as to clamp the hook 3, or other device, such as the swivel 2 between them. The length of arms 30 and 31 is such as to accommodate the longest hook which it is desired to use, and the position of offset 32 determines the shortest hook which can be held in the device. Shaft 33 is provided with a hand crank 36 to facilitate the turning or rotation of head 28 during the forming of a coil.

In operating the device to attach, for example, a hook 3 to a leader wire the procedure is as follows. While lever 11a is held depressed in the dotted position shown in Fig. 1, so as to open an aperture between the inner surface of lip 17 and the wire-engaging surface 13 of pivoted member 11, the end portion 10 of a piece of leader wire is inserted in this aperture. It will be understood that the leader wire, which is indicated by the dotted lines extending above Fig. 1, may be of any desired length, say from 10 or 12 inches to several feet. The length of the end portion 10 inserted in the aperture just referred to depends upon the number of turns desired in the coil 6 which is to be formed, and varies with the gauge of the wire used.

After the insertion of the end portion 10 lever 11a is released and the tension of spring 15 closes the wire-engaging surface 13 against the wire, exerting a predetermined pressure against it. With the end portion 10 thus held, the wire is bent with the fingers rather sharply at right angles, as shown in Fig. 1, and the loop, such as loop 5, is formed in the wire by bending it through slot 29 and around head 28.

The wire is bent through an angle of substantially 360° so that the two sides of the loop are substantially parallel and the body portion 37 of the leader wire is placed parallel with and in engagement with the anvil surfaces of members 8, 11, and 17, that is the upper ends of these members. Body portion 37 is laid into the corner formed by these anvil surfaces and the projecting upper portion of member 18. The parts of the wire then lie as shown in Fig. 1, and jaw member 21 may be closed upon them and held tightly closed between the thumb and fingers of one hand.

With the other hand, crank 36 is rotated slowly in the clockwise direction as shown in Fig. 2. The rotation of head 28 causes loop 5, formed in the wire as just described, to be twisted or rotated. This motion carries the front part of loop 5 over the body portion 37 of the wire, this body portion also being simultaneously turned on its own axis 5 by the rotary movement of head 28. This rotation of the body portion 37 causes the end portion 10 of the wire to be drawn out from between the guiding and friction-applying means 13, 17 and bent or coiled around body portion 37 as a mandrel, thereby forming a coil such as the coil 6 (Fig. 3) about body portion 37. In Fig. 3 the end portion 10 has been almost entirely withdrawn and at this point the pressure on head 28 is increased so that the end of the wire will be bent to substantially the same curvature as the remainder of the coil.

As the turns of coil 6 increase, the right end of the coil extends more and more to the right of jaw 21 and the anvil members. Accordingly loop 5 and rotary head 28 also must recede and this is provided for through the resiliency of L-shaped frame member 34.

Rotary head 28 may be considered as a hook-shaped member in which the shank portion is indicated by reference numeral 30 and the bight of the hook is formed by the slot or recess 29. This bight portion is in alignment with the body portion 37 of the wire so that head 28 rotates on an axis which passes through the bight portion of the head and is at right angles to the shank portion 30. The shape of the cross section of the hook-shaped head 28 at its bight portion governs the shape of the loop or eye 5 to be formed, as may be seen, for example, in Fig. 7. Accordingly the thickness of head 28 may be increased or decreased as desired, and also the distance of the bottom of slot 29 from the outer surface of the bight to vary the proportions and shape of the eye 5.

It will be understood that the pressure between members 22 and 24 of jaw 21, and their opposite members 8 and 11 exerted on the coil during the winding operation and the confining of the sides of the coil by members 18 and 25 keeps the coil straight and smooth. The increase of pressure towards the end of the coil formation causes the end of the wire to be bent sharply so as to produce a smooth coil throughout. On the completion of the coil jaw 21 is raised and loop 5 is swung upwardly and removed from rotary head 28.

In order to make a complete tool so as to eliminate the necessity of carrying wire cutters for cutting the wire into appropriate lengths a pair of slots 38 and 39 may be provided, respectively, in frame member 9 and the left hand of bar 22. By making these parts of hardened steel a serviceable wire cutter is provided.

The invention has been described and illustrated in connection with only one embodiment of it and it will be understood that changes and variations may be made as may be convenient or desirable without departing from the spirit of the invention. The scope of the invention is therefore considered to extend to such changes as may come within the following claims.

I claim:
1. In a device for making fishing leaders, guiding and friction applying means for receiving and engaging the end portion of a length of wire which is to form a leader, a coil forming anvil, an eye-supporting head adapted to receive a loop formed in said wire adjacent said end portion, the body portion of said wire being received on said anvil, means for supporting said head for rotation about an axis parallel to and substantially in line with the surface of said anvil, the rotation of said head serving to rotate the body portion of said wire and to cause said body portion to draw the end portion of said wire from said guiding and friction applying means and wind it about said body portion as a mandrel, and a jaw member movable into engagement with the coil on said anvil, said anvil and jaw member being shaped to engage the surface of said coil as it is formed and serving as pressure-applying means to squeeze said end portion as it emerges from the guiding and friction applying means close about the body portion of said wire to produce a smooth coil.

2. In a device for making fishing leaders, guiding and friction applying means for receiving and engaging the end portion of a length of wire which is to form a leader, a coil forming anvil adjacent and at right angles to said guiding means, an eye-supporting head adapted to receive a loop formed in said wire adjacent and at right angles to said end portion, the body portion of said wire being received on said anvil at right angles to said end portion thereof, means for supporting said head for rotation about an axis which is substantially tangent to the portion of said wire as it emerges from said guiding means, the rotation of said head serving to rotate the body portion of said wire and to cause said body portion to draw the end portion of said wire from said guiding and friction applying means and wind it about said body portion as a mandrel, and a jaw member movable into engagement with the coil on said anvil, said anvil and jaw member being shaped to engage the surface of said coil as it is formed and serving as pressure-applying means to squeeze said end portion as it emerges from the guiding and friction applying means close about the body portion of said wire to produce a smooth coil.

3. A device as claimed in claim 1 in which the rotary eye-forming head is of generally hook shape having shank, bight and tongue portions and rotates about an axis at right angles to said shank portion.

4. A device as claimed in claim 1 in which the rotary eye-forming head is provided with a clamp for supporting a fish hook or the like with the eye thereof adjacent said head.

5. A device as claimed in claim 1 in which the means for supporting the eye-supporting head is yieldingly mounted on the frame of the device so as to allow the head to recede from the anvil as the coil lengthens.

ELI E. GREGORY.

REFERENCES CITED

The following references are of record in the file of this patent:

UNITED STATES PATENTS

| Number | Name | Date |
| --- | --- | --- |
| 177,221 | Dederick | May 9, 1876 |
| 1,333,994 | Page | Mar. 16, 1920 |
| 1,752,726 | Brannaka | Apr. 1, 1930 |
| 1,951,891 | Williams | Mar. 20, 1934 |
| 2,367,320 | Walters | Jan. 16, 1945 |